Nov. 13, 1934.  A. HOLLANDER  1,980,337
IMPELLER MOUNTING
Filed July 14, 1933
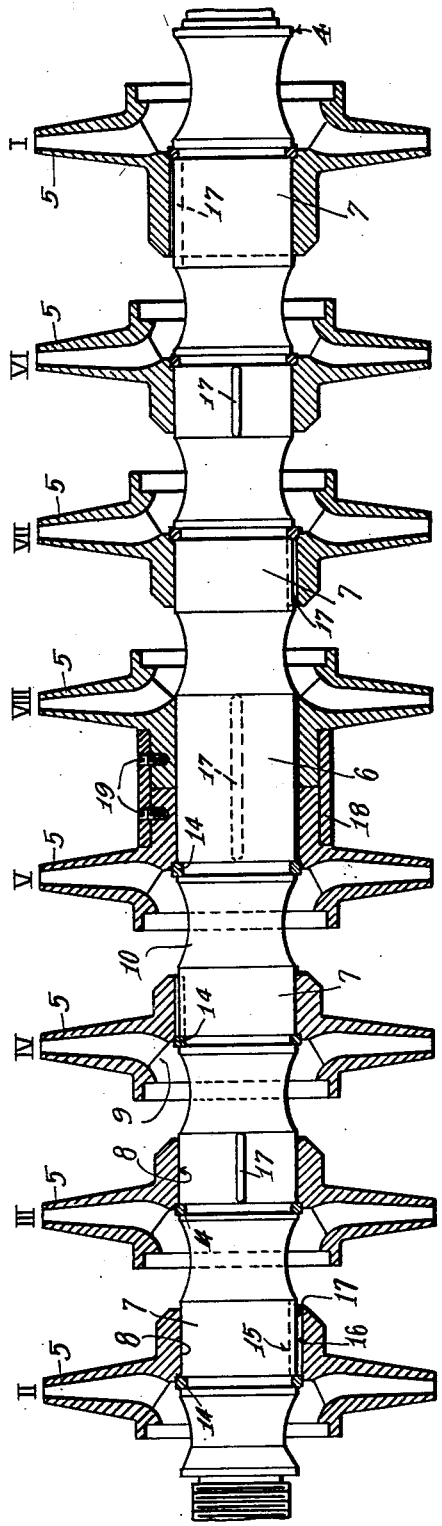
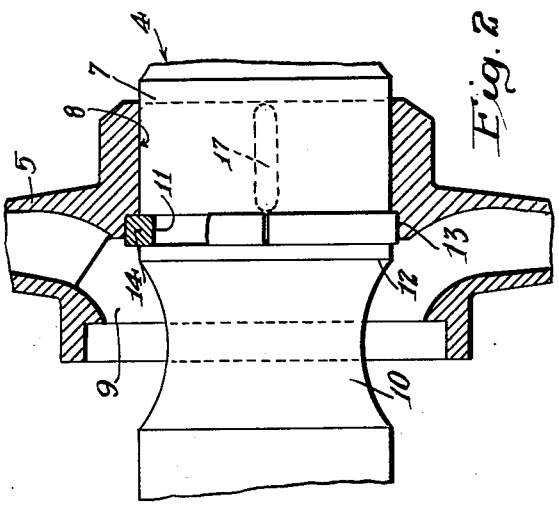
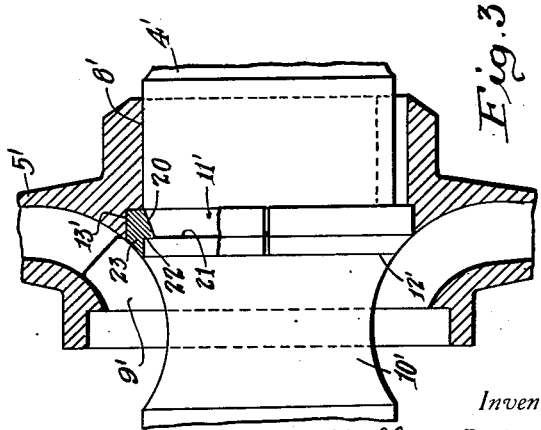
Inventor
*Aladar Hollander*
By *Lyon & Lyon*
Attorneys Patented Nov. 13, 1934

1,980,337

UNITED STATES PATENT OFFICE 1,980,337

IMPELLER MOUNTING

Aladar Hollander, Berkeley, Calif., assignor to Byron Jackson Co., Los Angeles, Calif., a corporation of Delaware Application July 14, 1933, Serial No. 680,401

9 Claims. (Cl. 103—111)

This invention relates to an impeller mounting.

It is an object of this invention to provide an impeller mounting in which the split ring keeper may be close to the center line of the impeller, and in which the shaft may be turned down or streamlined so as to provide a greater inlet area of streamline flow to the impeller inlet passage, while the impeller hub section of the shaft may be of still greater diameter to compensate for the weakening effect thereupon, due to the cutting of the keyway and keeper grooves therein.

A further object it to arrange the split ring groove relatively close to the streamlined section of the shaft, whereby the stress concentration in the shaft will be materially reduced, as the stress line will run from the section of reduced diameter through the keeper groove as if the adjacent shoulder thereof were not there.

A further object is to taper the split ring groove away from the radial shoulder or face thereof, whereby the stress concentration in this section of the shaft may be further reduced.

A further object is to streamline the shaft of a multi-stage pump by reducing the diameter of the shaft at the suction inlet side of each impeller, and to provide a keeper groove in the greater diameter of the shaft but close to the section of reduced diameter, so as to reduce the stress concentration of the shaft and so that each split ring keeper will take up the individual thrust of each impeller, and to thus hold the impellers axially fixed.

A further object is to mount upon the shaft a pair of single suction impellers arranged in back-to-back relation and connecting the two hub sections of the impellers, whereby the unit formed thereby may be retained in correct axial alignment upon the shaft, due to the resultant axial hydraulic thrust acting thereagainst to maintain the unit in abutting engagement with a split ring keeper located adjacent the streamlined shaft section of the lower pressure impeller.

A further object is to provide a shaft having a plurality of impeller receiving lands, all of equal diameter, whereby each impeller may be slid over the shaft into position and for providing a split ring keeper means adjacent the inlet end of each impeller land, for independently retaining each impeller fixedly mounted upon its own respective shaft land.

Other objects and advantages of the invention will become apparent as the nature of the same is more fully understood from the following description and accompanying drawing, wherein is set forth what is now considered to be a preferred embodiment. It should be understood, however, that this particular embodiment of the invention is chosen principally for the purpose of exemplification, and that variations therefrom in details of construction or arrangement of parts may accordingly be effected and yet remain within the spirit and scope of the invention as the same is set forth in the appended claims.

In the drawing:

Figure 1 illustrates a fragmental sectional view, taken in the axial plane of a multistage pump shaft having mounted thereon a plurality of single suction impellers;

Figure 2 illustrates a view similar to Fig. 1, but showing in enlarged detail a portion of the shaft and one impeller and the mounting therefor; and Figure 3 illustrates a view similar to Fig. 2, but of a modified form of mounting means.

In order to simplify the drawing, the pump casing and fluid passages have not been shown, as any appropriately designed casing with the proper fluid passages may be used, and also because the casing with its fluid passages and auxiliary parts form no part of this invention.

This invention is of especial value when used for the mounting of a number of impellers upon a single pump shaft. In Fig. 1 the pump shaft 4 has mounted thereon eight single suction impellers 5, which may be arranged in series, thus providing an eight-stage pump. The most appropriate arrangement for the different impeller stages has been indicated by roman numerals in Fig. 1; however, any other arrangement may be made and also a greater or less number of impellers may be provided.

One of the important features of this invention is the particular way in which each impeller is mounted upon the shaft in connection with the treatment of the shaft adjacent the suction inlet passages thereof.

The center portion of the shaft may be provided with a wide land 6 upon which land may be seated the fifth and eighth stage impellers, while to each side thereof, the shaft may be provided with separate lands 7, for the remaining impellers. All of the lands are preferably of the same diameter to enable the impellers to be slid thereover.

The hub bore 8 of each impeller should be of such diameter as to form a light press fit upon the lands. The shaft adjacent the fluid inlet passage 9 of each impeller, may be provided with a section of gradually reducing and increasing diameters as at 10, in order to not only streamline the fluid inlet passage of each impeller, but also to provide the maximum area for each impeller inlet passage.

As is well understood in this art, the resultant axial hydraulic thrust acting upon each impeller, will endeavor to slide each impeller along the shaft in the direction of its suction inlet passage. The thrust of the axial hydraulic force acting upon each impeller, may be utilized for independently maintaining each impeller in correct axial alignment by providing the shaft with an appropriate groove and split ring keeper adjacent the suction inlet passage thereof, whereby the axial thrust will act to maintain the impellers in abutting engagement with their respective keepers.

All of the keeper grooves may be alike, and therefore only one will be described. Referring particularly to Fig. 2, it may be observed that the keeper groove 11 may be located between the impeller land 7 and the inner end 12 of the section of gradually decreasing and increasing diameters, which section may be conveniently referred to as the streamlined section 10. It is desirable to make the diameter of the shaft measured in the bottom of the groove substantially larger than the minimum diameter of the streamlined section, and to position the groove close to the inner end of the streamlined section, to thereby materially reduce the stress concentration of the shaft as the stress line will run from the streamlined section through the groove to the impeller land as if the shoulder, formed between the groove and streamlined section, were not present.

The impeller bore 8 may be counterbored as at 13, so as to nicely fit over a sufficient section of the split ring keeper 14, for maintaining the keeper in place and for preventing it from flying out in a radial direction during the rotation of the shaft at relatively high speeds.

Any suitable form of key means may be provided for positively causing each impeller to rotate with the shaft, as for example, a keyway 15 may be milled in each impeller land, while a registering keyway 16 may be machined in each of the impeller hubs, and a suitable key 17 positioned therein. As may be observed from Fig. 1, the shaft keyway 15 of each land may be advaned 90° with relation to the keyway of the preceding land, so as not to weaken the shaft in one plane.

The two center impellers, that is the fifth and eighth stage impellers, may be mounted upon the single shaft land 6 in back-to-back relation, so that the fluid inlet passages of these impellers will face in opposite directions. The fifth and eighth stage impellers may be connected together to form a unit, or by means of the connecting sleeve 18 securely fastened to the hubs of these impellers by suitable screw means 19, so that a single keeper may be utilized for retaining these impellers in their correct operative positions. The resultant axial hydraulic thrust acting upon the connected impellers, will act to urge this unit in the direction of the suction inlet passage of the lower stage impeller thereof, which, in this case, would be toward the suction inlet passage 9 of the fifth stage impeller, and therefore it will be necessary to only provide a split ring keeper adjacent the suction end of the fifth stage impeller, for the impeller unit to thrust against to be thereby retained in correct axial alignment.

The impellers may be assembled onto the shaft in any preferred order, as for example, the center pair of impellers may be first positioned, and then the remaining impellers assembled thereon. To assemble the center impellers upon the shaft, the key means may be first positioned in the keyway formed in the center land, the impellers separately or as coupled together slid along the shaft until adjacent the sixth land, whereupon the keyways thereof may be registered with the key, and then slid onto the land until just before reaching their operative positions, whereupon the split ring keeper may be assembled in the shaft groove 11, and thereafter the unit may be slid into engagement with the keeper and thus correctly located upon the shaft. The counterbored section 13 of the fifth stage impeller will act to seal the keeper in its locking position. Should it be desired to next assemble the fourth stage impeller upon the shaft, this impeller may be slid along the shaft until opposite its respective land, whereupon the key 17 may be positioned in the shaft keyway 15, the impeller turned until the keyway 16 thereof registers with the key, and then slid along its land until the groove 11 becomes exposed sufficiently for the mounting of the split ring keeper therein, whereupon the impeller may be returned until abutting against the keeper, and thus correctly located upon the shaft. And similarly, the remaining impellers may be assembled.

If the impeller bores snugly fit the shaft lands, it may assist in the assembly thereof, by expanding the impeller bores by heating the same, while the shaft is maintained relatively cold.

It may be advisable to provide the bottom corners of the grooves 11 with filets of suitable size, so as to avoid sharp corners in these portions of the shaft, which sharp corners might result in the concentration of stress in their locality.

A few of the advantages obtained by the use of this invention, result in the locating of the split ring keepers close to the center line of the impellers, the shaft streamlined to provide maximum fluid inlet passages into the impellers, and the shaft at each impeller land brought up to a diameter of sufficient size for compensating for the weakening effect of the keyway cut therein, and also of great importance is the locating of the keeper grooves close to the streamlined sections of the shaft and of greater diameter than the minimum diameter of the streamlined section, whereby the stress concentration in these sections of the shaft will be materially reduced as the stress lines will run from the locality of minimum diameter of the streamlined sections through the grooves, to the lands as if the outer shoulders of the grooves were not present.

A modified form of the invention is illustrated in Fig. 3, wherein like parts have been given the same numerals primed. In the modified form of the invention, the split ring keeper groove 11' may be tapered as at 20, in this way further reducing the stress concentration in these portions of the shaft. The outer radial face of the keeper groove may form the shoulder 21 against which the shoulder 22 of a correspondingly tapered keeper ring may seat while the remaining portions of the keeper ring may be like the keeper ring as illustrated in Figs. 1 and 2. However, in order to provide for the streamlining of the fluid inlet passage without a break or interruption, and thereby to reduce the turbulence created in the fluid flowing through the passage, the split ring keeper may be provided with an annular flange 23 of such size as to nicely fill the gap between the shaft and the counterbored section of the impeller and the outer portion of the flange shaped to streamline the fluid inlet passage between the shaft and impeller.

The shaft constructions of this invention have several advantages over a shaft of uniform diameter. A few of such advantages are as follows: Take for example a shaft of uniform diameter, and turn therein the keeper groove, thus establishing a plane of weakness within a restricted area, or in other words, due to the sudden change in shaft section, the stress concentration will be very much greater than could be figured from the reduced section, and should such a shaft be continually operated under relatively heavy loads, the shaft would be liable to fracture in the plane of the keeper groove. A further disadvantage of the shaft of uniform diameter resides in the throttling effect of the shaft upon the area of the fluid inlet passage to the impeller, should the shaft be made large enough in diameter to compensate for the weakening effect of the keyways milled therein, or if made of smaller diameter so as not to throttle the inlet passage, then the shaft will be unduly weakened by the cutting of the keyways and keeper grooves therein. As will be readily appreciated, applicant's shaft construction and impeller mounting overcome all of these defects by providing the shaft with impeller seating lands of such diameter as to compensate for the weakening effect of the keyways cut therein, and providing relatively long sections of decreasing and increasing diameters for streamlining the fluid inlet passages and thereby providing impellers with passages of maximum inlet area, and by providing the keeper grooves close to the streamlined sections of the shaft and of a greater diameter than the minimum diameter of the streamlined sections, the stress at each impeller will be distributed over a relatively wide area instead of being concentrated at a plane of weakness as would be the case with a shaft of uniform diameter having keeper grooves turned therein.

Having fully described the invention, it is to be understood that the invention is not to be limited to the details herein set forth, but is of the full scope of the appended claims.

I claim:

1. In a fluid pump, a shaft having an impeller seating land, a single suction impeller mounted upon the shaft land, said shaft having a section of reduced diameter adjacent the suction inlet passage of the impeller for not only stream-lining but also for increasing the effective area of the impeller fluid inlet passage, said shaft having an annular groove formed in the land adjacent the impeller end of the stream-lined section thereof and said groove having a minimum diameter greater than the minimum diameter of the stream-lined section of the shaft, a split ring keeper mounted in the annular shaft groove for locking the impeller against axial movement in one direction, said impeller having a counterbored section adapted to slide over said keeper for retaining the keeper in its operative position, and key means for causing the impeller to rotate with the shaft.

2. In a fluid pump, a shaft having an impeller seating land, a single suction impeller mounted upon the shaft land, said shaft having a section of reduced diameter adjacent the suction inlet passage of the impeller for not only stream-lining but also for increasing the effective area of the impeller fluid inlet passage, said shaft having an annular groove formed in the land adjacent the impeller end of the stream-lined section thereof and said groove having a minimum diameter greater than the minimum diameter of the stream-lined section of the shaft, a split ring keeper mounted in the annular shaft groove for locking the impeller against axial movement in one direction, said impeller having means for retaining the keeper within the groove, and key means for causing the impeller to rotate with the shaft.

3. In a multistage fluid pump, a shaft, having a plurality of impeller seating lands, a single suction impeller mounted upon each of said shaft lands, said shaft having a section of reduced diameter adjacent the suction inlet passage of each of the impellers for not only streamlining but also for increasing the effective area of the fluid inlet passage of each impeller, said shaft having an annular groove formed in each land adjacent the impeller end of the corresponding streamlined section thereof and said groove having a minimum diameter greater than the minimum diameter of the stream-lined section of the shaft, a keeper mounted in each annular shaft groove for locking the impellers against axial movement in the direction of the axial thrust of the respective impellers, each of said impellers having means for retaining its respective keeper within the groove, and key means for causing the impellers to rotate with the shaft.

4. In a fluid pump, a shaft having an impeller seating land, a single suction impeller mounted upon the shaft land, said shaft having a section of reduced diameter adjacent the suction inlet passage of the impeller, said shaft having an annular groove formed in the land adjacent the impeller end of the section of reduced diameter and said groove having a minimum diameter greater than the minimum diameter of said section, and a keeper mounted in the annular shaft groove for locking the impeller against axial movement in the direction of the axial thrust of the impeller.

5. In a fluid pump, a shaft having an impeller seating land, a single suction impeller mounted upon the shaft land, said shaft having a section of gradually reducing diameters adjacent the suction inlet passage of the impeller, said shaft having an annular groove formed in the land adjacent the impeller end of the section of reduced diameter, and said groove having a minimum diameter greater than the minimum diameter of the section of reduced diameter, and a keeper mounted in the annular shaft groove for locking the impeller against axial movement in the direction of axial thrust thereof.

6. In a fluid pump a shaft having an impeller seating land, a single suction impeller mounted upon the shaft land, said shaft having a section of reduced diameter adjacent the suction inlet passage of the impeller for not only stream-lining but also for increasing the effective area of the impeller fluid inlet passage, said shaft having a tapered annular groove formed in the land and having the radial shoulder thereof located adjacent the impeller end of the stream-lined section, and a tapered keeper mounted in the groove and seated against the groove shoulder for taking up the axial thrust of the impeller.

7. In a fluid pump a shaft having an impeller seating land, a single suction impeller mounted upon the shaft land, said shaft having a section of reduced diameter adjacent the suction inlet passage of the impeller for not only stream-lining but also for increasing the effective area of the impeller fluid inlet passage, said shaft being provided with a tapered annular groove having the radial shoulder thereof located adjacent the impeller end of the stream-lined section, a tapered keeper mounted in the groove and seated against the groove shoulder for locking the impeller against axial movement, said impeller having a counter-bored section adapted to fit over the keeper for retaining the keeper in its operative position, and said keeper being shaped to stream-line the fluid inlet passage between the shaft and impeller.

8. In a fluid pump a shaft having an impeller seating land, a single suction impeller mounted upon the shaft land, said shaft having a section of reduced diameter for stream-lining the impeller fluid inlet passage, said shaft having an annular groove adjacent the impeller end of the stream-lined section thereof, and a keeper mounted in the groove for locking the impeller against axial movement and shaped to stream-line the fluid inlet passage between the shaft and impeller.

9. In a multistage fluid pump, a shaft having an impeller seating land, a pair of single suction multistage impellers mounted upon the shaft land in back to back relation, means for operatively interconnecting the impellers, said shaft having a section of reduced diameter adjacent the inlet passage of each impeller for stream-lining said passages, said shaft having an annular groove adjacent the impeller end of the stream-lined section thereof for the lower stage impeller, and a keeper mounted in the groove for locking said impellers against axial movement.

ALADAR HOLLANDER.